United States Patent [19]

Toyokura et al.

[11] Patent Number: 5,103,419
[45] Date of Patent: Apr. 7, 1992

[54] CIRCUIT FOR CALCULATING THE SUM OF PRODUCTS OF DATA

[75] Inventors: Masaki Toyokura; Kunitoshi Aono, both of Osaka; Toshiyuki Araki, Kyoto, all of Japan

[73] Assignee: Matsushita Electric Industrial Co., Ltd., Japan

[21] Appl. No.: 473,760

[22] Filed: Feb. 2, 1990

[30] Foreign Application Priority Data

Feb. 2, 1989 [JP] Japan .................................. 1-24188

[51] Int. Cl.⁵ .............................................. G06F 7/38
[52] U.S. Cl. .............................................. 364/750.5
[58] Field of Search .................. 364/750.5, 754, 760, 364/757

[56] References Cited

U.S. PATENT DOCUMENTS

| | | | |
|---|---|---|---|
| 4,121,296 | 10/1978 | Snijders et al. | 364/750.5 |
| 4,575,812 | 3/1986 | Kloker et al. | 364/760 |
| 4,644,491 | 2/1987 | Ookawa et al. | 364/750.5 |
| 4,761,756 | 8/1988 | Lee et al. | 364/760 |
| 4,939,687 | 7/1990 | Hartley et al. | 364/757 |

FOREIGN PATENT DOCUMENTS 1-201771 8/1989 Japan.

Primary Examiner—Gary V. Harkcom
Assistant Examiner—Long T. Nguyen
Attorney, Agent, or Firm—Lowe, Price, Leblanc & Becker

[57] ABSTRACT

A sum-of-products calculating circuit includes a bit extension circuit, wherein the most significant bit of an intermediate result of the multiplication effected by a multiplier is extended from an order one bit of the order higher than that of the most significant bit of the intermediate result of the multiplication to the sign bit of addition input data to an adder, by using the most significant bit of each of two intermediate results of the multiplication effected by a multiplier and the sign bit of each of multiplication input data to the multiplier. The data having the extended data bits are inputted to an adder as addition data for the addition performed therein. Thereby, the number of bits used for representing output data of the multiplier can be equalized with that of bits used for representing input data of the adder by a simple logic circuit without the addition of dummy bits to the addition data. Thus, the component elements of the calculating circuit is substantially reduced in number.

5 Claims, 6 Drawing Sheets

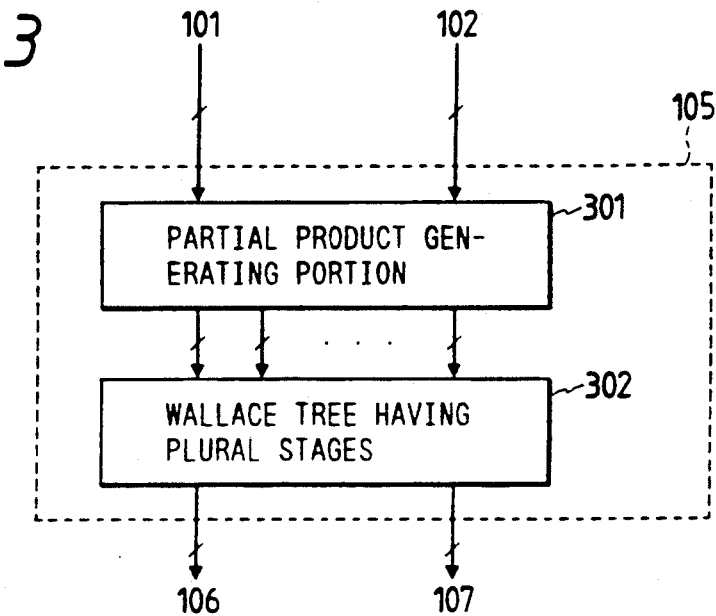
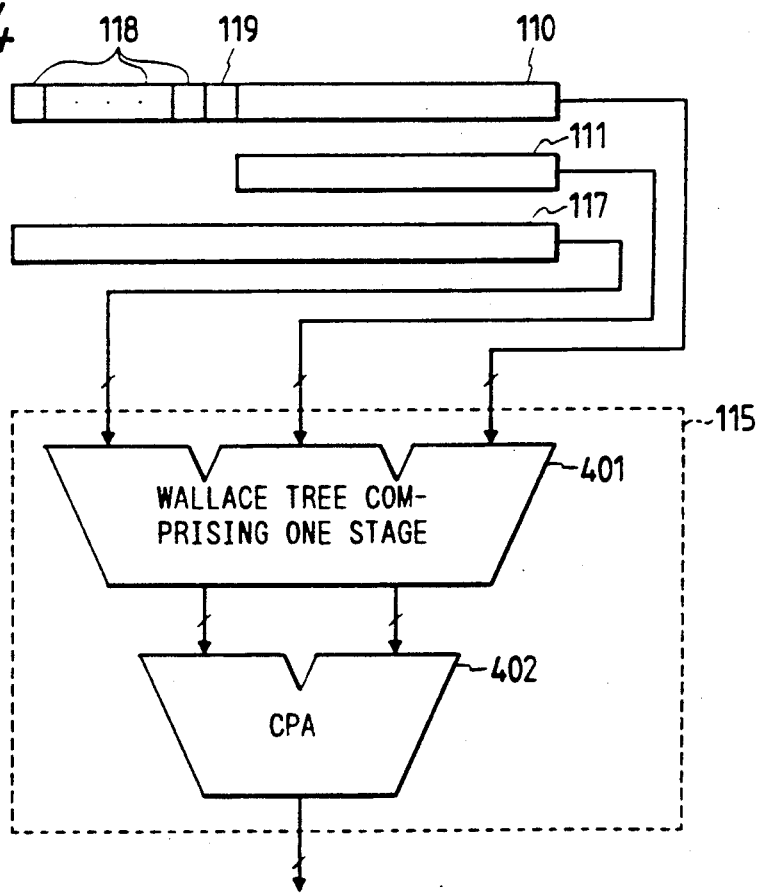

CIRCUIT FOR CALCULATING THE SUM OF PRODUCTS OF DATA

BACKGROUND OF THE INVENTION

1. Field of The Invention

This invention generally relates to a circuit for calculating the sum of products of data (hereunder sometimes referred to simply as a sum-of-products calculating circuit) for use in filtering, a matricial operation such as matrix multiplication and so on and more particularly to a sum-of-products calculating circuit having pipeline structure in which a multiplier and an adder are provided and two parallel outputs of a two-output multiplier are written into registers for the purpose of achieving high speed processing, which circuit can equalize the number of bits used for representing output data of the multiplier with that of bits used for representing input data of the adder. 2. Description of The Related Art First, the construction of a conventional sum-of-products calculating device will be described hereinbelow. FIG. 5 shows the construction of a first example of the conventional sum-of-products calculating device. In this figure, reference numerals 505 and 506 are registers for storing two multiplication input data; 507 a pipeline register for writing multiplication output data therein; 508 a register for storing addition input data; and 509 a register for storing sum output data. Further, reference numeral 501 indicates a partial product generating portion for generating a partial product from the two multiplication input data; 502 a plurality of stages of a Wallace Tree for obtaining two data by performing the addition of the partial products generated by the partial product generating portion 501; and 503 a carry propagation adder (CPS) for obtaining multiplication output data by performing the addition of the two resultant data obtained by performing the addition of the plurality of the stages of the Wallace Tree 502. Morever, reference numeral 504 denotes a CPA for effecting the addition of the multiplication output data 507 and the addition input data 508. In case where a multiplier is constructed by employing a parallel system such as the Wallace Tree, a process of obtaining an output of a multiplier is comprised of the step of obtaining the two output data by using the plurality of the stages of the Wallace Tree 502 from the partial products generated by the partial product generating portion 501 and the step of obtaining the output of the multiplier by performing the addition of the two outputs of the Wallace Tree by using the CPA 503. Further, in case where the bit length of the output data of the multiplier is nearly equal to that of the output of the CPA 503, the multiplication output and the addition input data are added to each other by effecting an operation of substantially the same extent as of the operation effected in the step of obtaining the output of the multiplier by performing the addition of the two outputs of the Wallace Tree. In case of using the configuration of FIG. 5, there is no (or little) difference between the operation time spent in the multiplication step of obtaining the two output data by using the plurality of stages of the Wallace Tree 502 and the CPA 503 and that spent in the addition step of obtaining the output of the multiplier by using the CPA 504. Thus, the performance is deteriorated, considering that the operation is effected by using a pipeline. Accordingly, by employing the sum-of-products calculating device as shown in FIG. 6, an increase of the efficiency of the pipeline processing is intended (see the Japanese Patent Application Provisional Publication No. 1-201771 official gazette "Sum of Products Calculating Device")). In FIG. 6, reference numerals 605 and 606 denote registers for storing the two multiplication input data; 607 and 608 are pipeline registers for writing two intermediate results of the multiplication thereinto; 609 is register for storing addition input data; and 610 is a register for storing addition output data. Further, reference numeral 601 indicates a partial product generating portion for generating a partial product from the two multiplication input data; 602 denotes a plurality of stages of a Wallace Tree for obtaining two data by performing the addition of the partial products generated by the partial product generating portion 601; 603 is another Wallace Tree composed of a single stage for obtaining two outputs from the two intermediate results 607 and 608 and the addition input data 609; and 604 is a carry propagation adder (CPA) for performing the addition of the two outputs of the stage of the Wallace Tree 603. In case of using the configuration of FIG. 6, the operation time spent by the partial product generating portion 601 and the plurality of stages of the Wallace Tree 602 comes to be nearly equal to that spent by the single stage of the Wallace Tree 603 and the CPA 604. Thereby, the performance of the pipeline is improved.

Further, in performing an operation of calculating sum of products, an overflow occurs by adding the results of the multiplication to each other. In order to prevent the overflow, the bit width of data processed by the adder is made larger than that of data processed by the multiplier. This results in the inconsistency of the bit width between the multiplier and the adder. Therefore, the bit width should be extended prior to the addition of the results of the multiplication.

As a conventional bit extension system employed in the sum-of-products calculating device of FIG. 6, a method has been proposed, for example, in which the bit width of the input data to the multiplier is preliminarily extended as dummy data such that the bit width of the two output data of the multiplier is made equal to that of data processed by the adder.

FIG. 7 is a diagram for illustrating an example of this conventional bit extension system. In this example, each multiplication input data to the multiplier is represented by using 4 bits (including a sign bit), and the multiplication of such input data is represented in the form "4-bit data $\times$ 4-bit data", for example, $a_3a_2a_1a_0 \times b_3b_2b_1b_0$. Further, data processed by the adder is represented by using 10 bits (including a sign bit), and addition input data is denoted by, for instance, $c_9c_8c_7c_6c_5c_4c_3c_2c_1c_0$. Morever, in order to perform the bit extension, the sign bit $a_3$ of the left term (i.e. the multiplicand) is extended to the left side thereof, and the extended bits are regarded as dummy data. Thus, the result of the above described example of the multiplication is obtained by performing the equation $a_3a_3a_3a_3a_2a_1a_0 \times b_3b_2b_1b_0$. Furthermore, each stage of the Wallace Tree is constructed by using a full adder in case where the number of data enclosed by an ellipse therein in FIG. 7 is 3 and by using a half adder in case where the number of data enclosed by an ellipse in 2 and sends the result of the operation effected therein to the next stage. The construction of the partial products in FIG. 7 is that of the system known as the Baugh-Wooleys' system of multiplying two's complements. In FIG. 7, the symbol $-$ is used for indicating an inverted number, and the expression "$a_3$ OR $b_3$" indicates the logical OR between numbers $a_3$ and $b_3$. Incidentally, in the calculation illustrated by FIG. 7, is utilized the fact that an expression $\overline{a_3+b}$ $\overline{3}_{+a3}.b_3$ corresponds to an operation "$a_3$ OR $b_3$". Further, in each stage of the Wallace Tree of FIG. 7, reference character S denotes a sum output of the full adder or of the half adder in the preceding stage thereof and reference character C denotes a carry outputted from the preceding stage thereof. In case of this example, the multiplier comes to obtain the two intermediate results at the third stage of the Wallace Tree thereof, and further, after the two intermediate results are written into the pipeline registers 607 and 608, the addition of these intermediate results and the 10- bit addition input $c_9c_8c_7c_6c_5c_4c_3c_2c_1c_0$ is effected by using the single stage of the Wallace Tree 603 and the CPA 604.

This conventional system, however, requires 12 full adders and 13 half adders provided in the plurality of stage of the Wallace Tree 602, as well as 16 registers used as pipeline registers, for generating the extended bits which represent dummy data. Thus, this conventional system needs a large number of component elements.

The present invention is provided to eliminate the drawbacks of the conventional system.

It is therefore an object of the present invention to provide a sum-of-products calculating circuit having a bit extension circuit which can reduce the number of component elements.

SUMMARY OF THE INVENTION

To achieve the above object, in accordance with the present invention, there is provided s sum-of-products calculating circuit which includes a bit extension circuit for equalizing the bit widths of output data in a multiplier with data to be added thereto.

The sum-of-products calculating circuit includes a parallel multiplier for generating first and second intermediate data representing intermediate results of a multiplication of the input data by calculating partial products, and a three-input adder which receives and adds first, second and third addition input data. A bit extension circuit receives a sign bit from each of the multiplication input data and the most significant bit of each of the intermediate data representing intermediate results of a multiplication of the first and second multiplication input data. The bit extension circuit generates a high order segment of the second addition input data by extending the most significant bit of the first intermediate data up to an order representing the sign bit of the first addition input data, based on the sign bit of the two received multiplication input data and based on the most significant bit of the two intermediate data. The bit extension circuit further generates an intermediate order segment of the second addition input data by calculating a sum of the most significant bit of the first and second intermediate data. The high order and intermediate order segments generated by the bit extension circuit are outputted to the three-input adder which also receives, as a low-order segment of the second addition input data a portion other than the most significant bit of the first intermediate data. The three-input adder receives as the third addition input data thereof a segment of the second intermediate data (other than the most significant bit thereof).

Thus, the inventive circuit equalizes the bit-widths of intermediate data outputted by the multiplier with data to be processed by the adder, without requiring the preliminary addition of dummy bits to the multiplication input data. Thus, the component elements can be substantially reduced in number.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 3 is a schematic block diagram for showing the construction of a parllel multiplying circuit which obtains two output data from two input data thereto;

FIG. 4 is a schematic block diagram for showing the construction of a three-input adder;

DETAILED DESCRIPTION OF PREFERRED EMBODIMENT

Hereinafter, a preferred embodiment of the present invention will be described by referring to the accompanying drawings.

Figure 1:
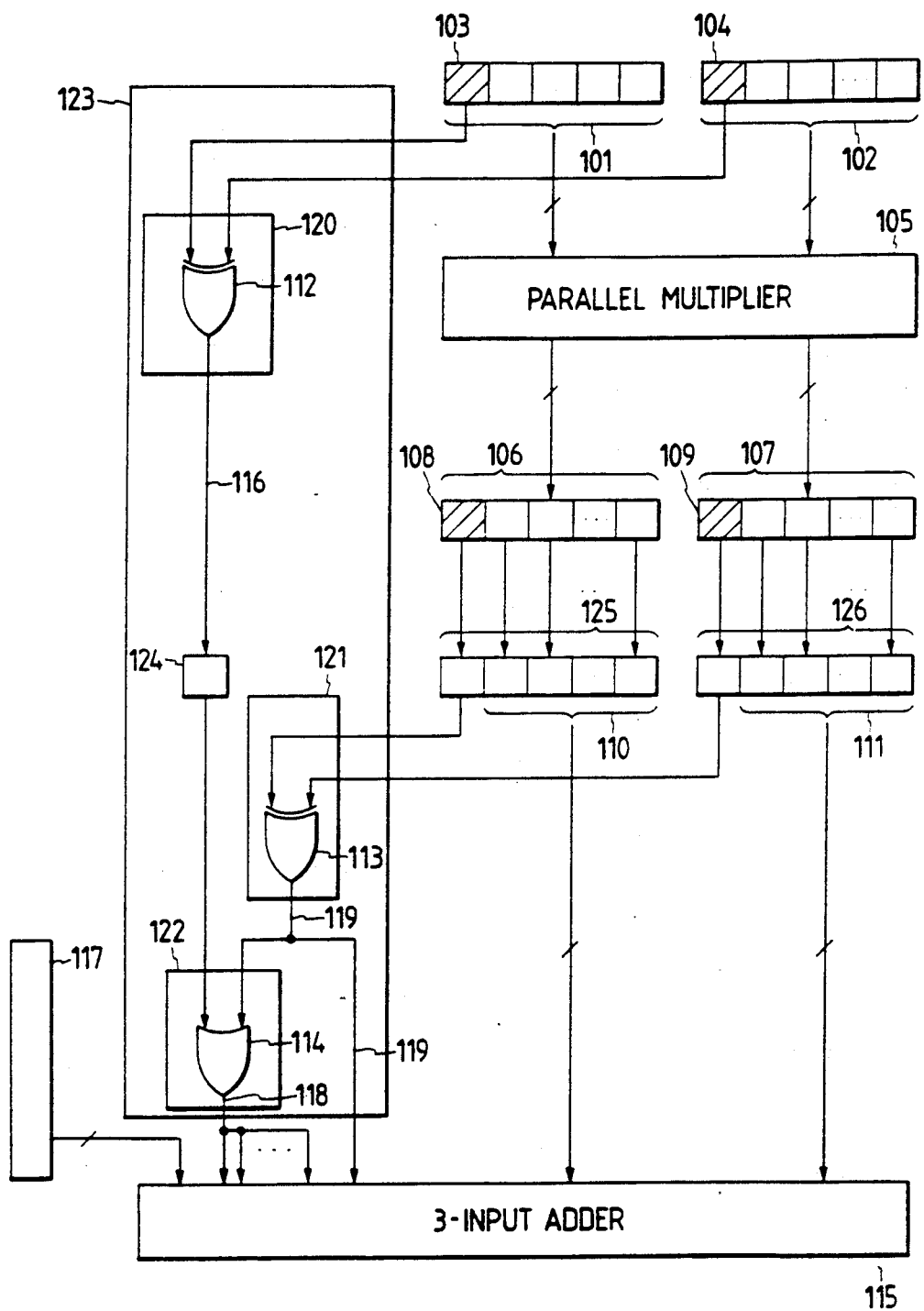
FIG. 1 is a schematic block diagram for showing the construction of a sum-of-products calculating circuit employing the bit extension according to the present invention.

FIG. 1 is a schematic block diagram of a sum-of-products calculating circuit employing a bit extension system according to the present invention. Further, the circuit of FIG. 1 performs a sum-of-products operation by a pipeline and uses pipeline registers. The construction of the sum of products will be hereinbelow with reference to FIG. 1.

In this figure, reference numerals 101 and 102 indicate input data to be used in multiplication (hereunder referred to as multiplication input data). Further, reference numeral 103 indicates the most significant bit (MSB) of the multiplication input date 101; 104 the MSB of the multiplication input data 102; and 105 a parallel multiplier for outputting two intermediate results of the multiplication. Reference numeral 106 denotes data composed of the MSB 108 and a part (hereunder sometimes referred to as lower order data) 110 represented by lower order bits than the MSB 108 indicating a first intermediate result of the multiplication performed by the parllel multiplier 105. On the other hand, reference numeral 107 denotes data composed of the MSB 109 and a part (hereunder sometimes referred to as lower order data) 111 represented by lower order bits than the MSB 109 indicating a second intermediate result of the multiplication performed by the multiplier 105. Moreover, reference numeral 123 represents a bit extension circuit consists of a sign generating circuit 120 for generating data 116 representing a sign of the result of the multiplication, an MSB sum generating circuit 121 for generating a sum of the MSBs of the data (hereunder sometimes referred to as multiplication output) outputted by the multiplier 105 and an extension bit generating circuit 122 fopr predicting occurrence of a carry and generating an extension bit. The circuits 120, 121 and 122 may be constructed by simple structure circuits. For example, the sign generating circuit 120 may be constructed by an exclusive OR (EXOR) circuit 112; the MSB sum generating circuit 121 an EXOR circuit 113; and the extension bit generating circuit 122 an OR circuit 114. Furthermore, reference numerals 124, 125 and 126 denote pipeline registers. The two intermediate results 106 and 107 are written into the pipeline registers 125 and 126, while the data 116 indicating the sign of the multiplication output is written into the pipeline register 124. The positions of the pipeline registers in the circuit can be changed in accordance with an operation time and the number of elements. Further, reference numeral 115 indicates a three-input adder. The parallel multiplier 105 can be implemented or constructed by employing a partial product generating portion 301 and a Wallace Tree 302 consisting of a plurality of stages for computing two outputs thereof from the partial products generated by the portion 302, as shown in FIG. 3. Moreover, the three-input adder 115 can be implemented or constructed by a Wallace Tree 401 composed of a single stage and a CPA 402, as shown in FIG. 4.

From the multiplication input data 101 and 102, the two intermediate results 106 and 107 are obtained by the parallel multiplier 105. Further, the lower order data 110 of the multiplication output 106 and the lower order data 111 of the multiplication output 107 become objects of the addition performed by the three-input adder 115. On the other hand, the MSB sum 119 is computed by the EXOR circuit 121 from the MSBs 108 and 109 of the two intermediate results of the multiplier 115. This MSB sum 119 becomes an object of the addition by the three-input adder 115 at the MSB 108 or 109 of the two intermediate results of the multiplier 105. Moreover, the sign 116 of the multiplication output is generated by the EXOR circuit 112 from the MSBs 103 and 104 of the two input data 101 and 102 to the multiplier 105. From the MSB sum 119 and the sign 116 of the multiplication output, a carry is looked ahead, and the extension bit 118 is generated by the OR circuit 114. The extension bit 118 are further extended and the result of the extension becomes an object of the addition performed by the three-input adder 115.

As shown in FIG. 4, an addition input data 117, the two data 110 and 111 and the extension bit 118, which is to be extended, and the MSB sum 119 are inputted to three-input adder 115.

Next, the principle of the bit extension system according to the present invention will be explained hereinbelow.

First, let M denote the bit width or length of an output of the multiplier 105; and N the bit width of an output of the adder 115 (incidentally, N is larger than M). Further, let $X_{M-1}X_{M-2}X_{M-3} \ldots X_0$ and $Y_{M-1}Y_{M-2}Y_{M-3} \ldots Y_0$ denote the two intermediate outputs of the multiplier 105; $Z_{M-1}Z_{M-2}Z_{M-3} \ldots Z_0$ a real output of the multiplier 105; and $C_{N-1}C_{N-2}C_{N-3} \ldots C_0$ an addition input 117 to the adder 115.

Then, the relation between the two intermediate outputs of the multiplier and the real output of the multiplier 105 is given by the following equation (1).

$$\begin{array}{r} x_{M-1}x_{M-2}x_{M-3} \ldots x_0 \\ +) \; y_{M-1}y_{M-2}y_{M-3} \ldots y_0 \\ \hline z_Mz_{M-1}z_{M-2}z_{M-3} \ldots z_0 \end{array} \quad (1)$$

where $Z_M$ is to be omitted as an invalid bit and thus a real or actual output of the multiplier 105 is $Z_{M-1}Z_{M-2}Z_{M-3} \ldots Z_0$. In this real output $Z_{M-1}Z_{M-2}Z_{M-3} \ldots Z_0$, the sign bit is $Z_{M-1}$. Thus, the sign bit $Z_{M-1}$ is extended such that the bit width of the output of the multiplier 105 is made equal to that of the addition input 117, and the result of the following equation (2) is obtained as the result of an addition.

Extended Bits      The Output of The Multiplier $$\begin{array}{r} z_{M-1}z_{M-1}z_{M-1} \ldots z_{M-1}z_{M-2}z_{M-3} \ldots z_0 \\ +) \; c_{N-1}c_{N-2}c_{N-3} \ldots c_M \, c_{M-1}c_{M-2}c_{M-3} \ldots c_0 \end{array} \quad (2)$$

In case of the bit extension system of the present invention, the bit extension expressed by the following equation (3) is performed such that the same result of the equation (2) is obtained.

$$\begin{array}{r} B_{EXT}B_{EXT}B_{EXT} \ldots B_{EXT} \, S \, x_{M-2}x_{M-3} \ldots x_0 \\ y_{M-2}y_{M-3} \ldots y_0 \\ +) \; c_{N-1}c_{N-2}c_{N-3} \ldots c_M \, c_{M-1}c_{M-2}c_{M-3} \ldots c_0 \end{array} \quad (3)$$

where $B_{EXT}B_{EXT}B_{EXT} \ldots B_{EXT}$, S, $X_{M-2}X_{M-3} \ldots X_0$, $Y_{M-2}Y_{M-3} \ldots Y_0$, $C_{N-1}C_{N-2}C_{N-3} \ldots C_MC_{M-1}C_{M-2}C_{M-3} \ldots C_0$ correspond to the data 118, 119, 110, 111 and 117 of FIG. 4, respectively.

Hereunder, the bit extension in each of the following cases will be explained.

(I) In case where $X_{M-1} = Y_{M-1}$, the sum of the two outputs of the multiplier 105 is first found by the following equation (A1).

$$\begin{array}{rl} & x_{M-1}x_{M-2}x_{M-3} \ldots x_0 + y_{M-1}y_{M-2}y_{M-3} \ldots y_0 \\ = & x_{M-1}00 \ldots 0 + y_{M-1}00 \ldots 0 \\ & + x_{M-2}x_{M-3} \ldots x_0 + y_{M-2}y_{M-3} \ldots y_0 \end{array} \quad (A1)$$

Here, let $X_{M-1} = Y_{M-1} = P$. Then $P + P = P0$. By this equality, the right side of the equation (A1) is reduced to the following equation (A2).

$$\begin{array}{rl} & x_{M-1}00 \ldots 0 + y_{M-1}00 \ldots 0 \\ & + x_{M-2}x_{M-3} \ldots x_0 + y_{M-2}y_{M-3} \ldots y_0 \\ = & P00 \ldots 0 + P00 \ldots 0 \\ & + x_{M-2}x_{M-3} \ldots x_0 + y_{M-2}y_{M-3} \ldots y_0 \\ = & P000 \ldots 0 \\ & + x_{M-2}x_{M-3} \ldots x_0 + y_{M-2}y_{M-3} \ldots y_0 \end{array} \quad (A2)$$

Further, from the equation (1), this equation (A1) is reduced to the following equation (A3).

$$P00\ldots0 \quad (A3)$$
$$+ x_{M-2}x_{M-3}\ldots x_0 + y_{M-2}y_{M-3}\ldots y_0$$
$$= Pz_{M-1}z_{M-2}z_{M-3}\ldots z_0$$

where P is an invalid bit and $Z_{M-1}$ denotes a sign. Therefore, the substitutions $B_{EXT}=Z_{M-1}$ and $S=0$ reduce the equation (3) to the following equation (4).

$$z_{M-1}z_{M-1}z_{M-1}\ldots z_{M-1}\, 0\, x_{M-2}x_{M-3}\ldots x_0 \quad (4)$$
$$y_{M-2}y_{M-3}\ldots y_0$$
$$+)\; c_{N-1}c_{N-2}c_{N-3}\ldots c_M\, c_{M-1}c_{M-2}c_{M-3}\ldots c_0$$

(II) In case where $X_{M-1} \neq Y_{M-1}$, the sum of the two outputs of the multiplier 105 is first reduced to the equation (A1), similarly as in case (I). That is, $$x_{M-1}x_{M-2}x_{M-3}\ldots x_0 + y_{M-1}y_{M-2}y_{M-3}\ldots y_0 \quad (A1)$$
$$= x_{M-1}00\ldots 0 + y_{M-1}00\ldots 0$$
$$+ x_{M-2}x_{M-3}\ldots x_0 + y_{M-2}y_{M-3}\ldots y_0$$

Since $X_{M-1} \neq Y_{M-1}$ and thus $X_{M-1}+Y_{M-1}=01$, the right side of the equation (A1) can be rewritten in the following equation (5).

$$x_{M-1}00\ldots0 + y_{M-1}00\ldots0 \quad (5)$$
$$+ x_{M-2}x_{M-3}\ldots x_0 + y_{M-2}y_{M-3}\ldots y_0$$
$$= 0100\ldots0$$
$$+ x_{M-2}x_{M-3}\ldots x_0 + y_{M-2}y_{M-3}\ldots y_0$$

In this case, the substitutions $B_{EXT}=Y_{M-1}=1$ and $S=1$ reduce the equation (3) to the following equation (6).

$$1\;1\;1\;\ldots\;1\;1\;\; x_{M-2}x_{M-3}\ldots x_0 \quad (6)$$
$$y_{M-2}y_{M-3}\ldots y_0$$
$$+)\; c_{N-1}c_{N-2}c_{N-3}\ldots c_M\, c_{M-1}c_{M-2}c_{M-3}\ldots c_0$$

Hereinafter, the bit extension by the equation (6) will be further explained with regard to the following two cases (i) and (ii) thereof.

(i) In case where there occurs no carry into a digit represented by $X_{M-1}$ (i.e. a digit represented by $Y_{M-1}$) in performing the calculation of the term $(X_{M-2}X_{M-3}\ldots X_0+Y_{M-2}Y_{M-3}\ldots Y_0)$, the equation (5) is rewritten in the form $$0100\ldots0 + X_{M-2}X_{M-3}\ldots X_0 + Y_{M-2}Y_{M-3}\ldots Y_0 = 01Z_{M-2}Z_{M-3}\ldots Z_0$$

because $X_{M-2}X_{M-3}\ldots X_0+Y_{M-2}Y_{M-3}\ldots Y_0=Z_{M-2}Z_{M-3}\ldots Z_0$. Therefore, the value of the sign bit $Z_{M-1}$ equals 1. Thus, the sign 1 is extended by performing the operation expressed by the equation (6).

(ii) In case where there occurs a carry into a digit represented by $X_{M-1}$ (i.e. a digit represented by $Y_{M-1}$) in performing the calculation of the term $(X_{M-2}X_{M-3}\ldots X_0+Y_{M-2}Y_{M-3}\ldots Y_0)$, the equation (5) can be rewritten as follows $$0100\ldots0 + x_{M-2}x_{M-3}\ldots x_0 + y_{M-2}y_{M-3}\ldots y_0$$

-continued
$$= 0100\ldots0 + 1z_{M-2}z_{M-3}\ldots z_0$$
$$= 10z_{M-2}z_{M-3}\ldots z_0$$

because $X_{M-2}X_{M-3}\ldots X_0+Y_{M-2}Y_{M-3}\ldots Y_0-1Z_{M-2}Z_{M-3}\ldots Z_0$. Therefore, the value represented by the sign bit $Z_{M-1}$ equals 0. Thus, when the operation expressed by the equation (6) is performed, the carry generated in the calculation of the term $(X_{M-2}X_{M-3}\ldots X_0+Y_{M-2}Y_{M-3}\ldots Y_0)$ causes carries into higher-order digit than the digit represented by $X_{M-2}$ or $Y_{M-2}$. This results in the same effects as obtained by extending the bit $Z_{M-1}(=0)$. Incidentally, $Z_{M-1}$ is obtained by an EXOR of the sign bits of the two multiplication inputs to the multiplier 105.

Here, the operations performed in the cases (I) and (II) are summarized as follows.

if $X_{M-1}=Y_{M-1}$ then $B_{EXT}=Z_{M-1}$, $S=0$ if $X_{M-1}\neq Y_{M-1}$ then $B_{EXT}=1$, $S=1$ \quad (7)

Further, these operations can be simply expressed by the following equation (8) by using logic symbols.

$$S=X_{M-1}\text{ EXOR }Y_{M-1}$$
$$B_{EXT}=Z_{M-1}\text{ OR }S \quad (8)$$

Figure 2:
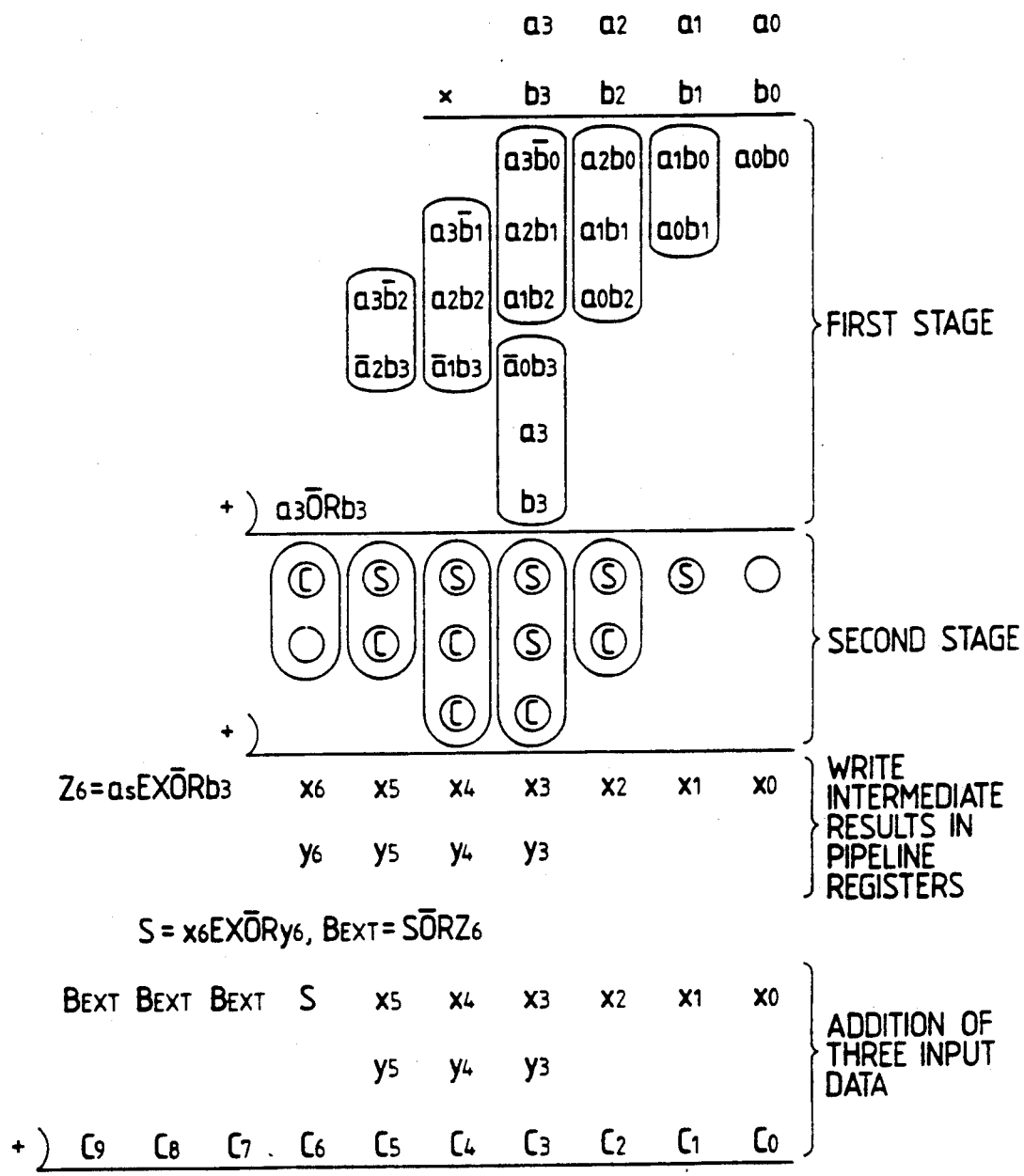
FIG. 2 is a diagram for illustrating an example of the bit extension system according to the present invention.
Figure 5:
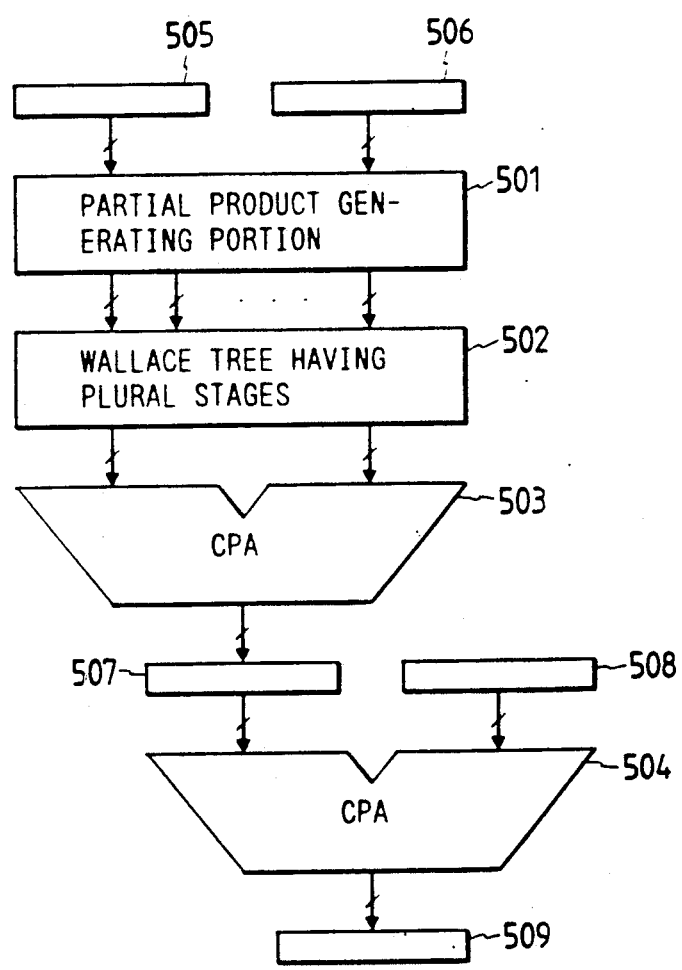
FIG. 5 is a schematic block diagram for showing the construction of a first conventional sum-of-products calculating circuit.
Figure 6:
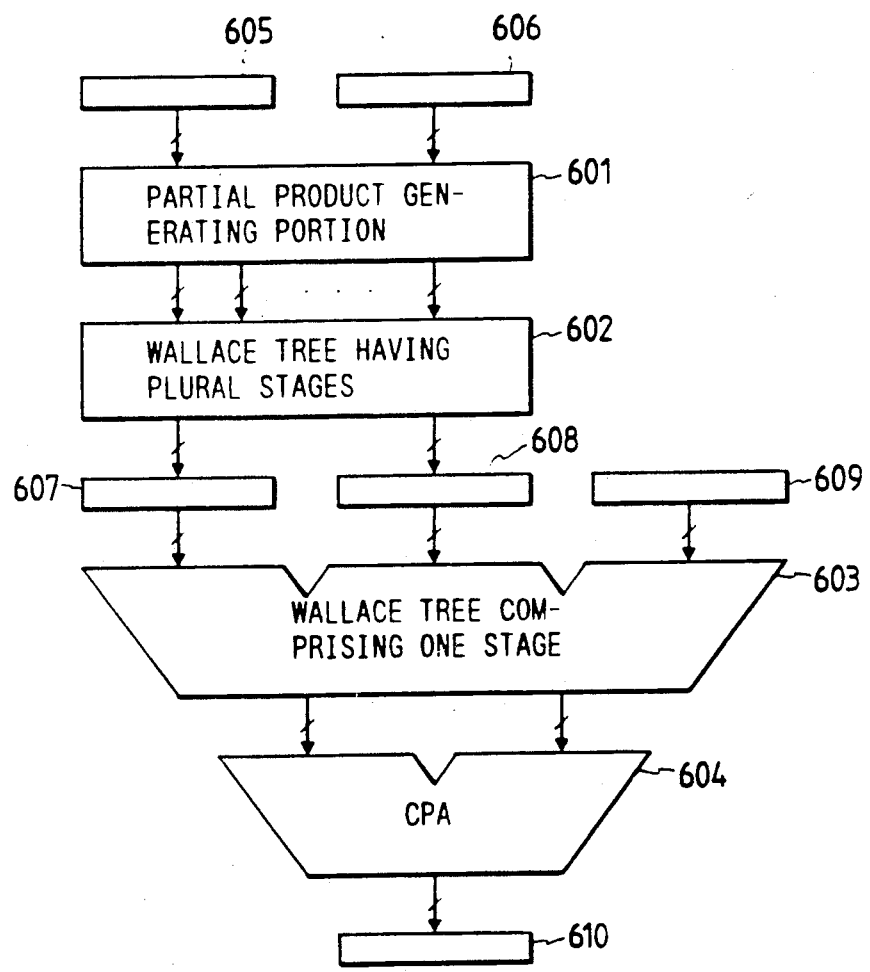
FIG. 6 is a schematic block diagram for showing the construction of a second conventional sum-of-products calculating circuit.
Figure 7:
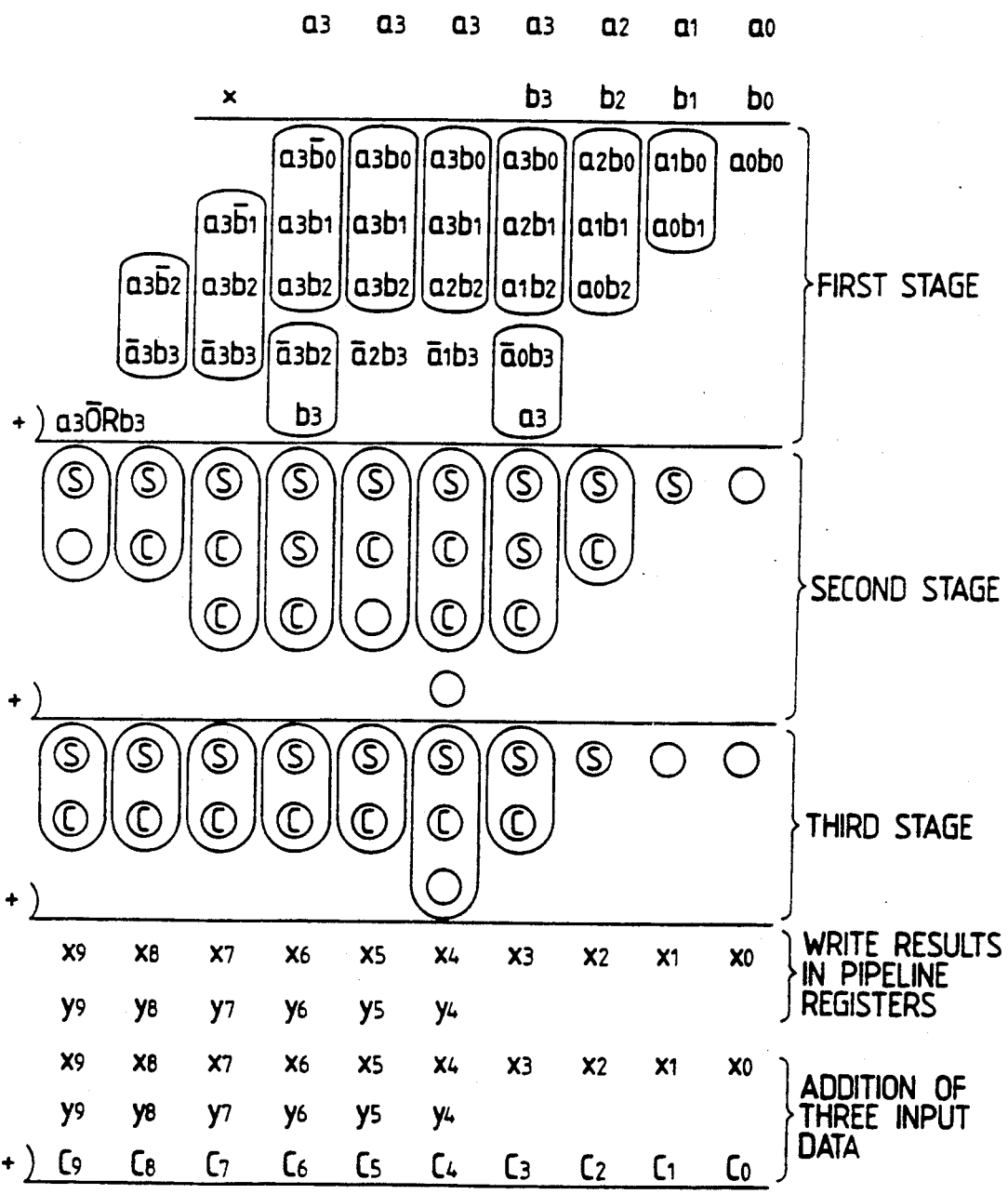
FIG. 7 is a diagram for illustrating an example of a conventional bit extension system.

FIG. 2 is a diagram for illustrating an example of the multiplication performed by using the bit extension system of the present invention in case where each of two multiplication input data is represented by use of 4 bits including a sign bit, and an adder adapted to operate on data represented by use of 10 bits including a sign bit. Similarly as in case of the description of the prior art, the multiplication input data to the multiplier is represented by $a_3a_2a_1a_0 \times b_3b_2b_1b_0$ and on the other hand an addition input data to the adder is represented by $C_9C_8C_7C_6C_5C_4C_3C_2C_1C_0$. Furthermore, similarly as in case of the prior art, each stage of the Wallace Tree is constructed by using a full adder in case where the number of data enclosed by an ellipse therein in FIG. 2 is 3 and by using a half adder in case where the number of data enclosed by an ellipse is 2 and sends the result of the operation effected therein to the next stage. The construction of the partial products in FIG. 2 is that known as the Baugh-Wooleys' system of multiplying two's complements, similarly as in case of FIG. 7. In FIG. 2, the symbol $-$ is used for indicating an inverted number, and the expression "$a_3$ OR $b_3$" indicates the logical OR between numbers $a_3$ and $b_3$. Further, in each stage of the Wallace Tree of FIG. 2, reference character S denotes a sum output of the full adder or of the half adder in the preceding stage thereof and reference character C denotes a carry outputted from the preceding stage thereof. In case of this example, the multiplier comes to obtain the two intermediate multiplication outputs at the second stage of the Wallace Tree thereof, and thereafter the operation expressed by the equation (8) is performed and further the addition of the result of this operation and the 10-bit addition input $C_9C_8C_7C_6C_5C_4C_3C_2C_1C_0$ is effected. By using the pipeline registers in the system of FIG. 1, the multiplication sign $Z_6$ and the two intermediate results $X_6X_5X_4X_3X_2X_1X_0$ and $Y_6Y_5Y_4Y_3$ of the multiplication are written into these pipeline registers. In case of this example, the system according to the present invention requires 6 full adders, 5 half adders, 2 EXOR gates, an OR gate, two registers used for pipeline registers, 11 registers used for storing the intermediate results of the multiplication and a register used for storing data indicating the sign bit. In comparison with the prior art system, the system of the present invention additionally requires 2 EXOR gates and an OR gate, while the number of full and half adders is reduced from 24 to 11 and that of pipeline registers is also reduced from 16 to 12 in the system of the present invention. Furthermore, three stages of the Wallace Tree are required for obtaining the two multiplication outputs of the multiplier in case of the prior art system, whereas the system of the present invention needs only two stages of the Wallace Tree to obtain the two multiplication outputs. Thereby, the present invention can save an operation time or computing time spent by the multiplication portion.

As above described, the present invention can substantially reduce the number of full and half adders which are primary composing elements of a multiplier. Further, although the present invention requires additional 2 EXOR gates and 1 OR gate in comparison with the prior art system, the bit width of data processed by a multiplier and that of data processed by an adder become larger than those in case of the prior art system. Thus, in case where the difference between the bit width of data processed by the multiplier and that of data processed by the adder is large, the reduction of the number of full and half adders is substantially effective in saving the composing elements and the cost of the system in case of the present invention. Therefore, the system of the present invention is very advantageous practically.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A sum-of-products calculating circuit having a parallel type multiplier for receiving first and second multiplication input data each represented in two's complement form, for generating first and second intermediate data respectively representing two intermediate results of a multiplication of the first and second multplication input data by calculating partial products from the first and second multiplication data, and a three-input adder for receiving and adding first, second and third addition input data each represented in two's complement form, the first addition input data being obtained from an external circuit and the second and third addition input data being obtained from the first and second intermediate data, said sum-of-products calculating circuit further comprising:

a bit extension circuit for receivimg a sign bit of each of the first and second multiplication input data and for receiving the most significant bit of each of the first and second intermediate data, for generating a high-order segment of the second addition input data by extending the received most significant bit of the first intermediate data from a bit having an order one bit higher than the most significant bit of the first intermediate data to a sign bit of the first addition input data on the basis of the sign bit of each of the received first and second multiplication input data and on the basis of the received most significant bit of each of the first and second intermediate data, said bit extension circuit also generating an intermediate-order segment of the second addition input data by calculating a sum of the most significant bit of the first intermediate data and that of the second intermediate data, said bit extension circuit outputting to said three-input adder the high-order and intermediate-order segments generated thereby for the second addition input data, said three-input adder receiving the high-order and intermediate-order segments of the second addition input data generated by said bit extension circuit and a segment of the first intermediate data other the most significant bit thereof as a low-order segment of the second addition input data, said three-input adder also receiving a segment of the second intermediate data other than the most significant bit thereof as the third addition input data, thereby equalizing bit-width of intermediate data outputted by said multiplier with bit-width of data to be processed by said adder without a preliminary addition of dummy bits to the multiplication input data.

2. A sum-of-products calculating circuit as set forth in claim 1, wherein said bit extension circuit comprises:

a first circuit for receiving the most significant bit of each of the first and second intermediate data, for calculating a sum of the most significant bit of the first and second intermediate data and for outputting the calculated sum;

a second circuit for receiving the sign bit of each of the first and second multiplication input data, for obtaining a sign of a result of the multiplication of the first and second multiplication input data from the sign bit of the first multiplication input and that of the second multiplication input data and for outputting the obtained sign; and a third circuit for receiving the calculated sum of the most significant bit of the first and second intermediate data outputted by said first circuit and the obtained sign of the result of the multiplication of the first and second multiplication input data outputted by said second circuit, said third obtaining extension bits which extend from an order higher than the most significant bit of the first intermediate data by one bit to an order of the sign bit of the first addition input data on the basis of the calculated sum received from said first circuit and the obtained sign received from said second circuit and for outputting the obtained extension bits.

3. A sum-of-products calculating circuit as set forth in claim 2, wherein said first and second circuits comprise exclusive-OR circuits, and said third circuit comprises an OR circuit.

4. A sum-of-products calculating circuit having a parallel type multiplier for receiving first and second multiplication input data each represented in two's complement form and each having a sign bit as the most significant bit thereof, for generating first and second intermediate data respectively representing two intermediate results of a multiplication of the first and second multiplication input data by calculating partial products from the first and second multiplication input data, and a three-input adder for receiving and adding first, second and third addition input data each represented in two's complement form, the first addition input data being obtained from an external circuit and the second and third addition input data being obtained from the first and second intermediate data, said sum-of-products calculating circuit further comprising:
- a first circuit for receiving the most significant bit of each of the first and second intermediate data, for calculating a sum of the most significant bit of the first and second intermediate data and for outputting the calculated sum;
- a second circuit for receiving the sign bit of each of the first and second multiplication input data, for obtaining a sign of a result of the multiplication of the first and second multiplication input data from the sign bit of the first multiplication input data and that of the second multiplication input data and for outputting the obtained sign; and
- a third circuit for receiving the calculated sum of the most significant bit of the first and second intermediate data outputted by said first circuit and the obtained sign of the result of the multiplication of the first and second multiplication input data outputted by said second circuit,
- said third circuit obtaining extension bits which extend from an order higher than the most significant bit of the first intermediate data by one bit to an order of the sign bit of the first addition input data on the basis of the calculated sum received from said first circuit and the obtained sign received from said second circuit and for outputting the obtained extensions bits,
- wherein the extension bits are used as a high-order segment of the second addition input data, said high-order segment extending from an order higher by one bit than the most significant bit of the first intermediate data to the order of the sign bit of the first addition input data, and the sum of the most significant bit of the first and second intermediate data is used as an intermediate-order segment of the second addition input data, of which the bit has an order of the most significant bit of the first intermediate data, and a segment of the first intermediate data other than the most significant bit thereof is used as a low-order segment of the second addition input data, and wherein a segment of the second intermediate data other than the most significant bit thereof is used as the second addition input data,
- thereby equalizing bit-width of the intermediate data outputted by said multiplier with bit-width of data to be processed by said adder.

5. A sum-of-products calculating circuit having a parallel type multiplier for receiving first and second multiplication input data each represented in two's complement form and each having a sign bit as the most significant bit thereof, for generating first and second intermediate data respectively representing two intermediate results of a multiplication of the first and second multiplication input data by calculating partial products from the first and second multiplication input data, and a three-input adder for receiving and adding first, second and third addition input data each represented in two's complement form, the first addition input data being obtained from an external circuit and the second and third addition input data being obtained from the first and second intermediate date, said sum-of-products calculating circuit further comprising:
- a first exclusive-OR circuit connected to receive the most significant bit of each of the first and second intermediate data for producing a first signal representing an exclusive OR thereof and for outputting the first signal;
- a second exclusive-OR circuit connected to receive the sign bit of each of the first and second multiplication input data for producing a second signal representing an exclusive-OR thereof and for outputting the second signal; and
- an OR circuit connected to receive the first and second signals representing the exclusive-OR of the most significant bit of the first and second intermediate data and the exclusive-OR of the sign bit of the first and second mulitplication input data, respectively, for obtaining extension bits which extend from an order one bit higher than the most significant bit of the first intermediate data to an order of the sign bit of the first addition input data on the basis of the first and second signals,
- wherein the extension bits are used as a high-order segment of the second addition input data, said high-order segment extending from an order higher by one bit than the most significant bit of the first intermediate data to the order of the sign bit of the first addition input data, and the exclusive-OR of the most significant bit of the first and second intermediate data is used as an intermediate-order segment of the second addition input data, of which the bit has an order of the most significant bit of the first intermediate data, and a segment of the first intermediate data other than the most significant bit thereof is used as a low-order segment of the second addition input data, and wherein a segment of the second intermediate data other than the most significant bit thereof is used as the second addition input data,
- thereby equalizing bit-width of the intermediate data outputted by said multiplier with bit-width of data to be processed by said adder.

* * * * *